United States Patent [19]
Wickham

[11] Patent Number: 4,649,329
[45] Date of Patent: Mar. 10, 1987

[54] ELECTRIC ACTUATORS

[75] Inventor: David J. Wickham, Chippenham, England

[73] Assignee: Westinghouse Brake and Signal Co., Chippenham, England

[21] Appl. No.: 724,590

[22] Filed: Apr. 18, 1985

[30] Foreign Application Priority Data

May 30, 1984 [GB] United Kingdom ............... 8413810

[51] Int. Cl.$^4$ ............................................. H02K 7/10
[52] U.S. Cl. .................................... 318/372; 188/162; 192/56 R; 318/9
[58] Field of Search ..................... 318/372, 362, 9-15; 192/150, 0.092, 56 R, 56 C; 188/162

[56] References Cited

U.S. PATENT DOCUMENTS

| | | | |
|---|---|---|---|
| 4,532,462 | 7/1985 | Washbourne et al. | 318/372 |
| 4,546,295 | 10/1985 | Wickham et al. | 318/372 |
| 4,546,296 | 10/1985 | Washbourne et al. | 318/372 |
| 4,546,297 | 10/1985 | Washbourne et al. | 318/372 |
| 4,546,298 | 10/1985 | Wickham et al. | 318/372 |

Primary Examiner—Benjamin Dobeck
Attorney, Agent, or Firm—Larson and Taylor

[57] ABSTRACT

An electric actuator having an electric motor operable to determine the output force generated on an output member by a spring; a drive shaft arranged to be driven by the electric motor and having first and second drive means, a non-rotational but axially movable intermediate member which is threadedly engaged with first driven means arranged to be driven by the first drive means; the spring being located between the intermediate member and the output member and arranged so that axial movement of the intermediate member is transmitted to the output member so long as the latter is free to move and, when the output member is restrained from movement, generates the output force on the output member upon continued operation of the electric motor; a stop carried by the intermediate member and positionally adjustable with respect thereto in the direction in which the intermediate member is axially movable, and second driven means with the second drive means, the first driven means being engageable with the stop to arrest its rotation and, hence, through the second drive means, to arrest further operation of the electric motor in its direction to increase the output force generated on the output member.

10 Claims, 1 Drawing Figure

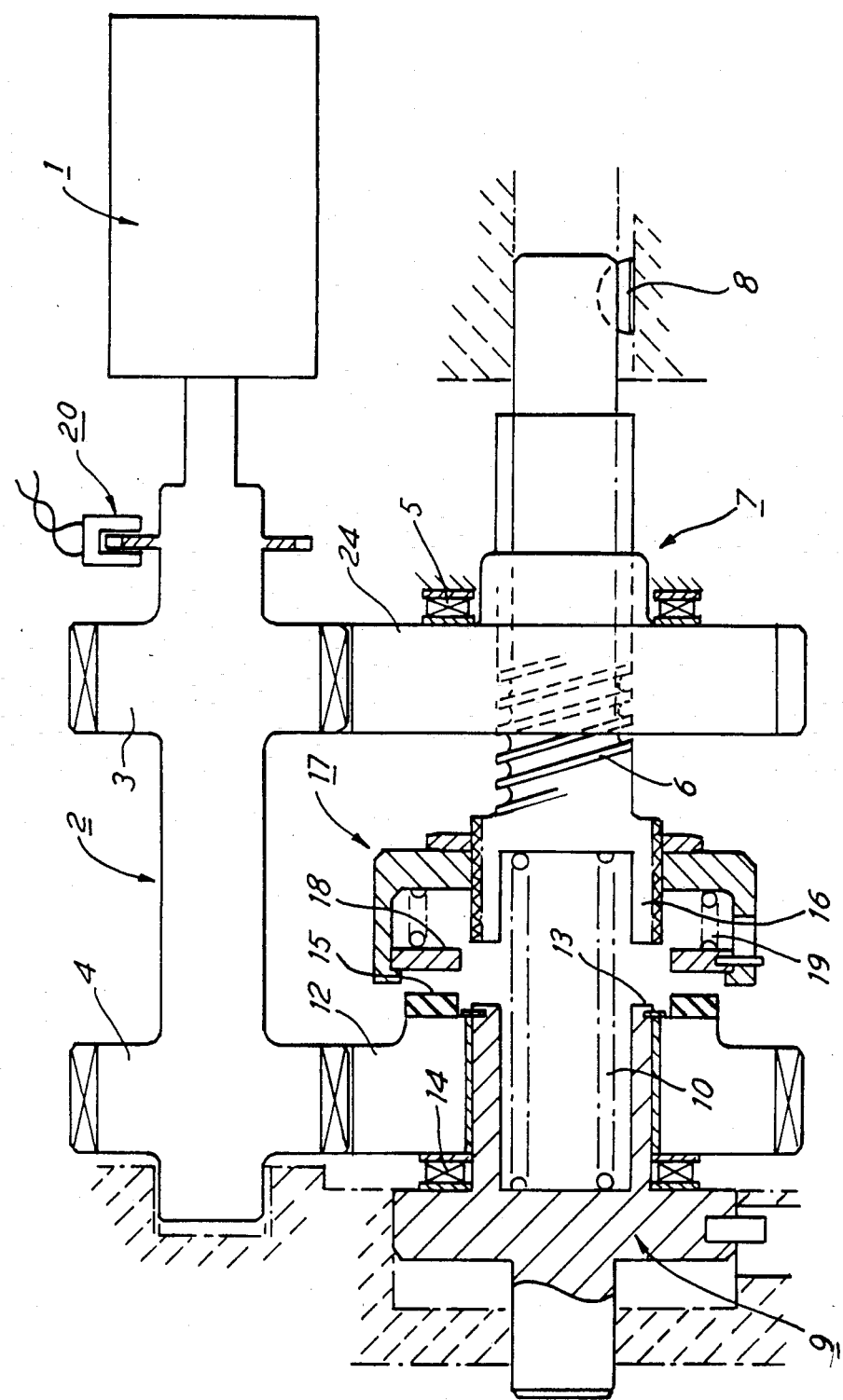

ELECTRIC ACTUATORS

This invention relates to electric actuators and, more particularly, to electric actuators having an electric motor operable to determine the output force generated on an output member by a spring system.

For such actuators it sometimes desirable to limit the maximum force which the actuator is to be permitted to exert. For example, in the use of such actuators as vehicle brake actuators, particularly for rail vehicles, it may be desirable to limit the maximum force in accordance with the load of the vehicle. This may well be particularly desirable when the tare-to-loaded ratio of the vehicle is particularly high. In the absence of any such limitation, there is a danger that the vehicle may be over-braked when empty with consequent risk of skidding during braking or, conversely, that the vehicle will be under-braked when loaded with a consequent excessive braking distance.

In co-pending Patent Application No. 607,633, now U.S. Pat. No. 4,546,298 there is described and claimed an electric actuator having an electric motor operable to determine the output force generated on an output member by a spring system, and an adjustable stop by which can be limited the maximum value of the output force, the position of the adjustable stop being variable in accordance with variation of the required maximum value of the output force to be exerted by the output member.

The present invention provides a particularly simple and technically desirable form of actuator embodying the general concepts of our co-pending Application.

Accordingly the present invention provides an electric actuator having an electric motor operable to determine the output force generated on an output member by a spring; a drive shaft arranged to be driven by the electric motor and having first and second drive means, a non-rotational but axially movable intermediate member which is threadedly engaged with first driven means arranged to be driven by the first drive means; the spring being located between the intermediate member and the output member and arranged so that axial movement of the intermediate member is transmitted to the output member so long as the latter is free to move and, when the output member is restrained from movement, generates the output force on the output member upon continued operation of the electric motor; a stop carried by the intermediate member and positionally adjustable with respect thereto in the direction in which the intermediate member is axially movable, and second driven means with the second drive means, the first driven means being engageable with the stop to arrest its rotation and, hence, through the second drive means, to arrest further operation of the electric motor in its direction to increase the output force generated on the output member.

Means may be provided for measuring rotation of the drive shaft.

The intermediate member may be keyed for restraint against rotation and may have a ball-screw portion by which it is threadedly engaged with the third gearwheel which then constitutes a nut.

The spring may be a compression spring.

The stop may be collapsible in the direction of axial movement of the intermediate member and may be threadedly engaged with the intermediate member so as to be axially positionally adjustable with respect thereto by relative rotation of the stop and the intermediate member.

The fourth gearwheel may be rotationally carried on the output member and may have a clutch face engageable by the stop.

One embodiment of the present invention will now be described in greater detail, by way of example only, with reference to the accompanying drawing which shows a cross-sectional view of the actuator.

Referring to the drawing; the actuator comprises an electric motor 1 the output drive shaft 2 of which carries first drive means or gearwheel 3 and second drive means or gearwheel 4.

The first gearwheel 3 meshes with first driven means in the form of a third gearwheel 24 supported for rotation by a thrust bearing 5. The axial bore of the gearwheel 24 is threaded for engagement with a ball-screw portion 6 of an intermediate member 7 which, at its right-hand end as viewed in the drawing is keyed at 8 so that the member 7 is free to move axially but is restrained against rotation.

Between the left-hand end of the member 7 and an output member 9 is a compression spring 10. The output member 9 is also keyed at 11 to be free for axial movement but, again, restrained from rotation.

Rotationally carried on the output member 9 is second driven means in the form of a fourth gearwheel 12 meshed with the second gearwheel 4. The fourth gearwheel 12 is located on the output member 9 between a circlip 13 and a thrust bearing 14 and, on its right-hand face carries a clutch face 15.

Threadedly engaged with the left-hand end portion 16 of the intermediate member 7, is a stop 17 axially positionally adjustable with respect to the member 17 by rotation of the stop 17 on the intermediate member 17. The stop 17 has a stop face 18 engageable by the clutch face 15 and resiliently loaded by a spring 19.

Carried by the drive shaft 2 is means 20 for measuring the rotation of the shaft 2; e.g. a Hall effect switch.

The above-described actuator is particularly suitable as a railway brake actuator for actuating a disc brake. In such use, the output member 9 would be arranged to operate on the pads of the disc brake and the position of the stop 17 would be adjusted in its position axially of the intermediate member 7 in accordance with the load of the railway vehicle.

For such application, the above described actuator operates as follows:

By control circuitry (not shown) the electric motor 1 is operated. Through the first gearwheel 3, the third gearwheel 24 will thereby be rotated to drive the intermediate member 7 to the left as viewed in the drawing. Such movement of the member 7, through the spring 10, will similarly drive the output member 9 until the brake pads engage the brake disc. Continued operation of the electric motor 1 after such engagement (which will arrest the movement of the output member 9) will compress the spring 10 and cause it to generate an output force on the output member 9 which will be transmitted to the brake pads as a braking force.

Such operation will continue until the braking force exerted is that which is required whereupon, this force having been measured by the means 20 having measured the required rotation of the drive shaft 2, further operation of the electric motor 1 will be terminated.

To release the brake, the electric motor 1 will merely be operated in the opposite sense to that in which it was operated to effect the brake application.

In the above description of operation, it has been assumed that the degree of brake application required was not in excess of that to be permitted in accordance with the load of the railway vehicle.

Had this been the case, before termination of operation of the electric motor 1 under the control of the means 20, the stop 17 would have been carried by the intermediate member 7 into engagement with the clutch face 15. It will have been noted that the fourth gearwheel 12 will rotate with the drive shaft 2 as it is rotated by the electric motor 1 axially to drive the intermediate member 7. Hence, when the stop 17 is brought into engagement with the clutch face 15 by the axial movement of the member 7, further rotation of the fourth gearwheel 12 will be prevented and, therefore, further operation of the electric motor 1. Thus, the maximum permitted value of the braking force will have been restricted to that permitted by the axial location of the stop 17 on the member 7—i.e. to the load of the railway vehicle.

Whilst, in the above described embodiment, a particular form of stop has been shown, alternative forms could be used. For example, it could be a drum brake.

The position of the stop 17 can be set in any convenient manner and need not be by the threaded engagement of the stop 17 with the intermediate member 7.

In order to reduce the torque required to release an emergency or full service brake application in which the emergency load cut-off brake/clutch has operated, a freewheel or one-way clutch can be inserted in the transmission—for example, in shaft 2 between the gearwheels 3 and 4.

I claim:

1. An electric actuator comprising an electric motor for determining the output force generated on an output member by a spring means; a drive shaft driven by the electric motor and comprising first and second drive means, a first driven means driven by said first drive means, a non-rotational but axially movable intermediate member which is threadedly engaged with said first driven means; said spring means comprising spring, located between the intermediate member and the output member, for transmitting axial movement of the intermediate member to the output member so long as the output member is free to move and for, when the output member is restrained from movement, generating the output force on the output member upon continued operation of the electric motor; a second driven means driven by said second drive means; a stop means, carried by the intermediate member and adjustable in position with respect thereto in the direction in which the intermediate member is axially movable, for engaging the second driven means to arrest the rotation thereof and to thus arrest rotation of the second drive means and, hence, by thus arresting rotation of the second drive means, to arrest further operation of the electric motor in the direction thereof which increases the output force generated on the output member.

2. An electric actuator as claimed in claim 1, further comprising means for measuring the rotation of the drive shaft.

3. An actuator as claimed in claim 1, further comprising key means for restraining the intermediate member against rotation.

4. An actuator as claimed in claim 1 wherein said first driven means comprises a gearwheel and the intermediate member has a ball-screw portion which threadedly engaged with said gearwheel so that said gearwheel constitutes a nut.

5. An actuator as claimed in claim 1, wherein the spring is a compression spring.

6. An actuator as claimed in claim 1, wherein the stop means comprises a collapsible stop which is collapsible in the direction of axial movement of the intermediate member.

7. A actuator as claimed in claim 1, wherein the stop means includes a portion which is threadedly engaged with the intermediate member so as to be axially positionally adjustable with respect thereto by relative rotation of the stop means and the intermediate member.

8. An actuator as claimed in claim 1, wherein said second driven means comprises gearwheel rotationally carried on the output member.

9. An actuator as claimed in claim 1 wherein the said second driven means includes a clutch face engageable by the stop means.

10. An actuator as claimed in claim 1 wherein said actuator constitutes a railway brake actuator.

* * * * *